April 17, 1951
C. E. PALMER
2,549,000
APPARATUS FOR APPLYING ADHESIVE TO BOX BLANKS AND THE LIKE
Filed Oct. 9, 1948
10 Sheets-Sheet 1
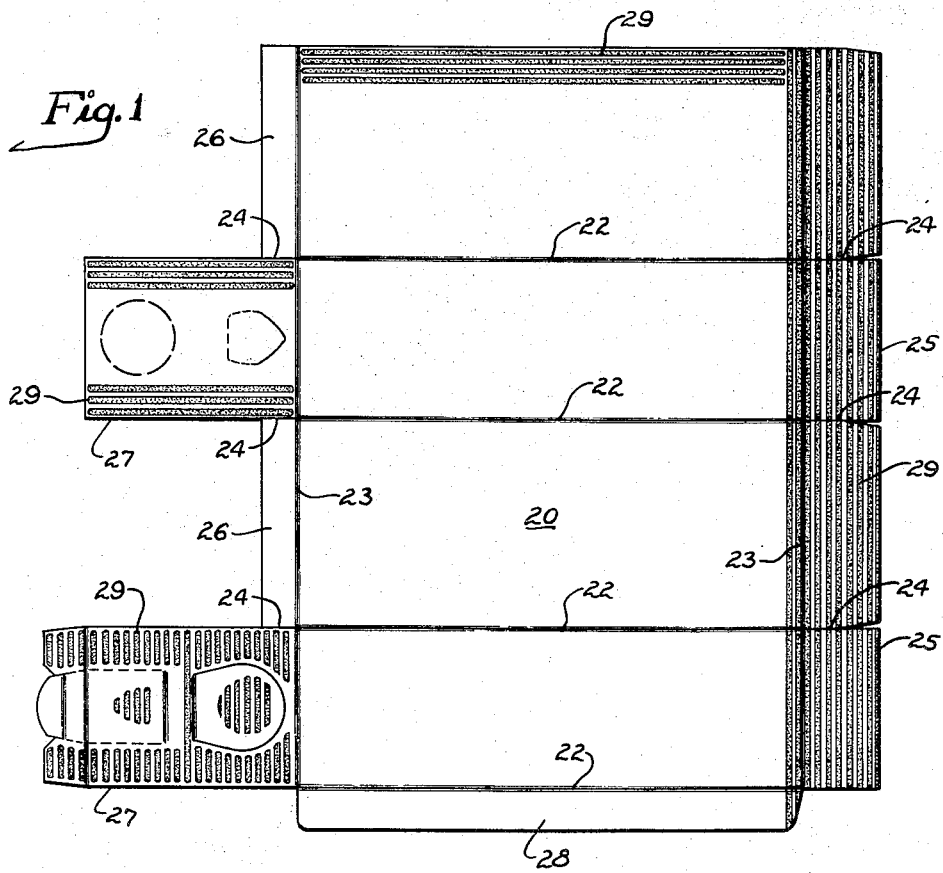
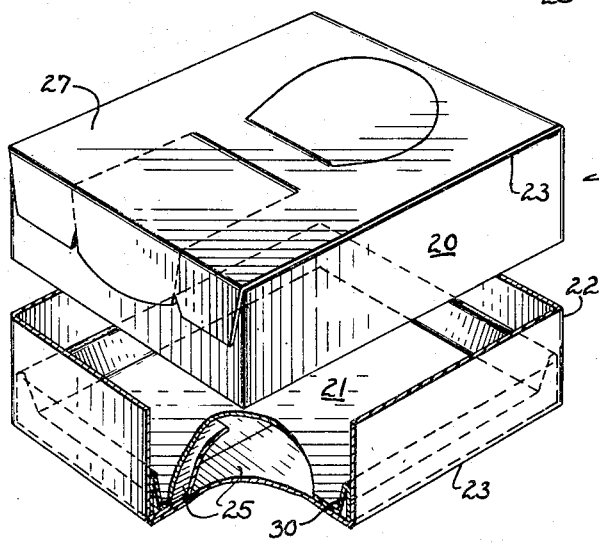
INVENTOR.
Charles E. Palmer
BY
Svans, Paul & Anderson
attys.

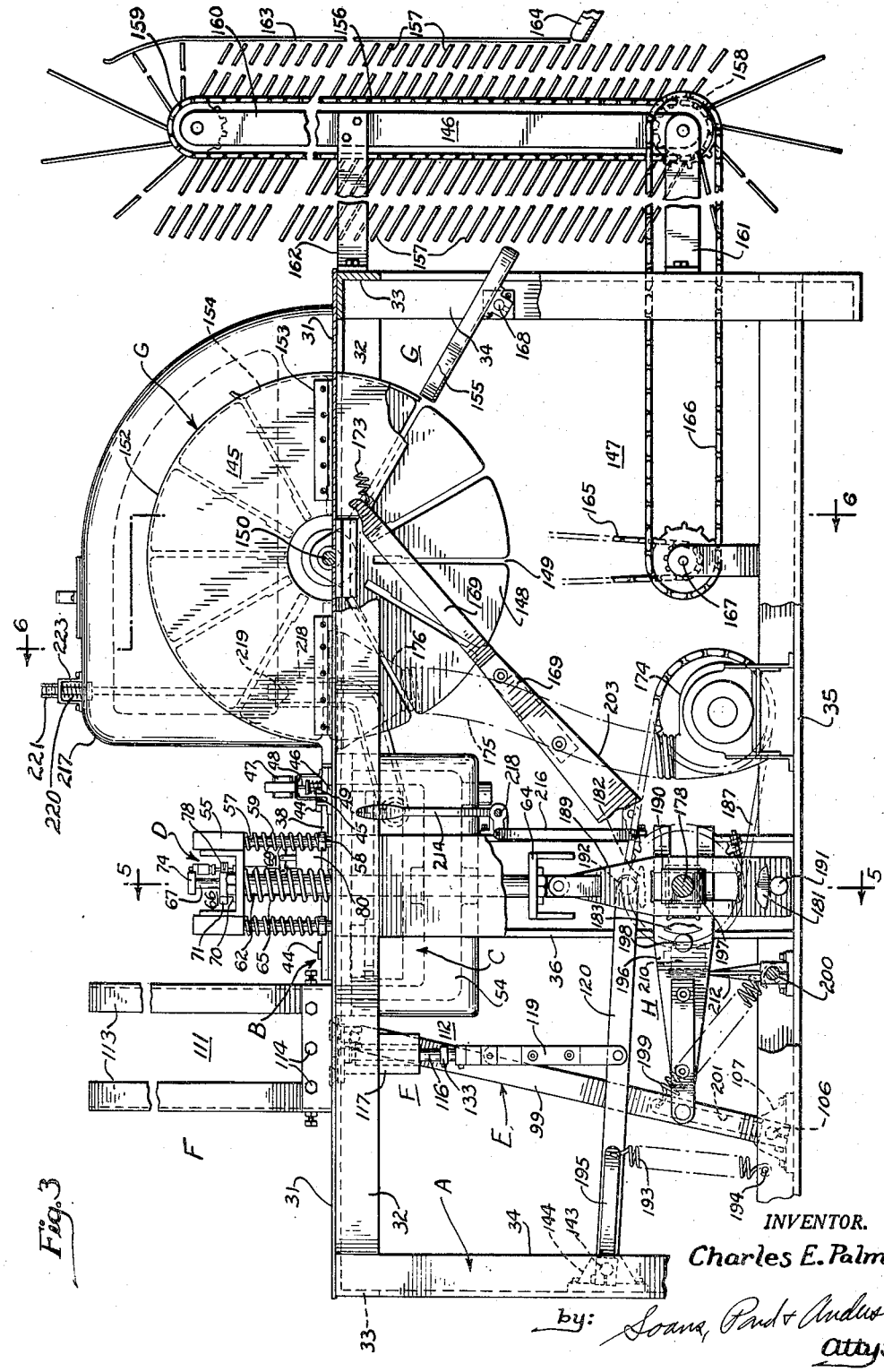

April 17, 1951
C. E. PALMER
2,549,000
APPARATUS FOR APPLYING ADHESIVE TO BOX
BLANKS AND THE LIKE
Filed Oct. 9, 1948
10 Sheets-Sheet 3
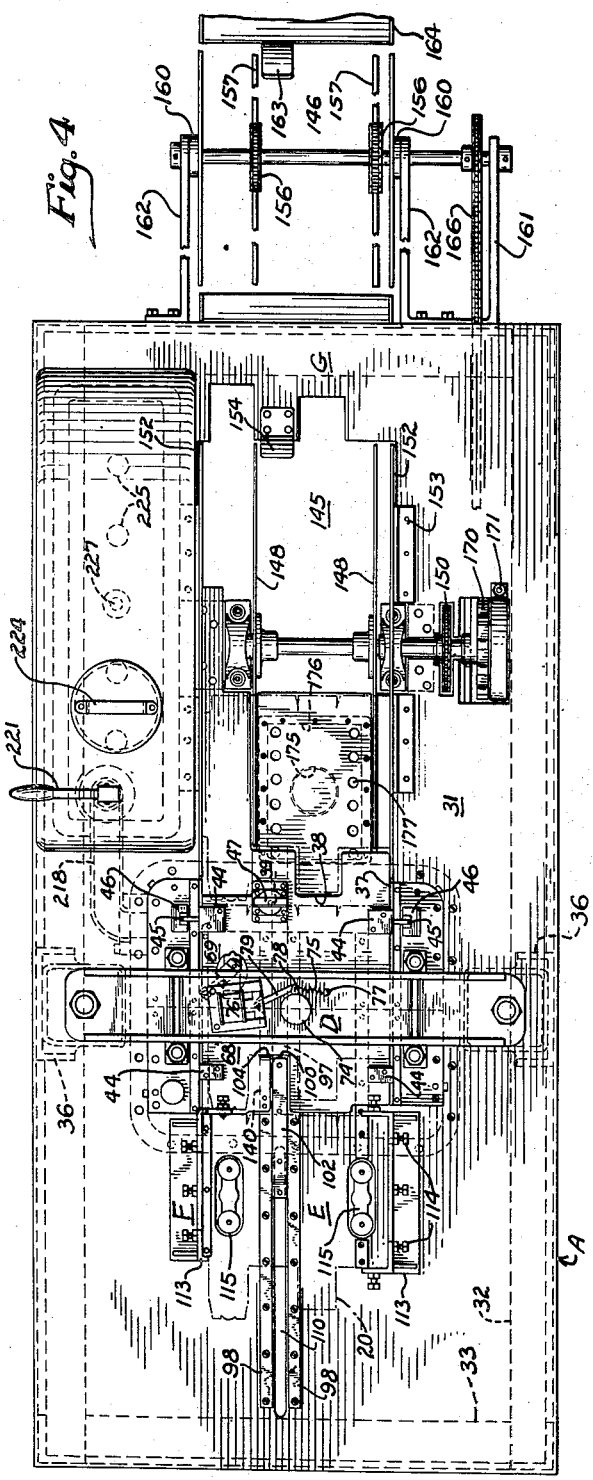
INVENTOR.
Charles E. Palmer
BY
Svains, Pond & Anderson
attys.

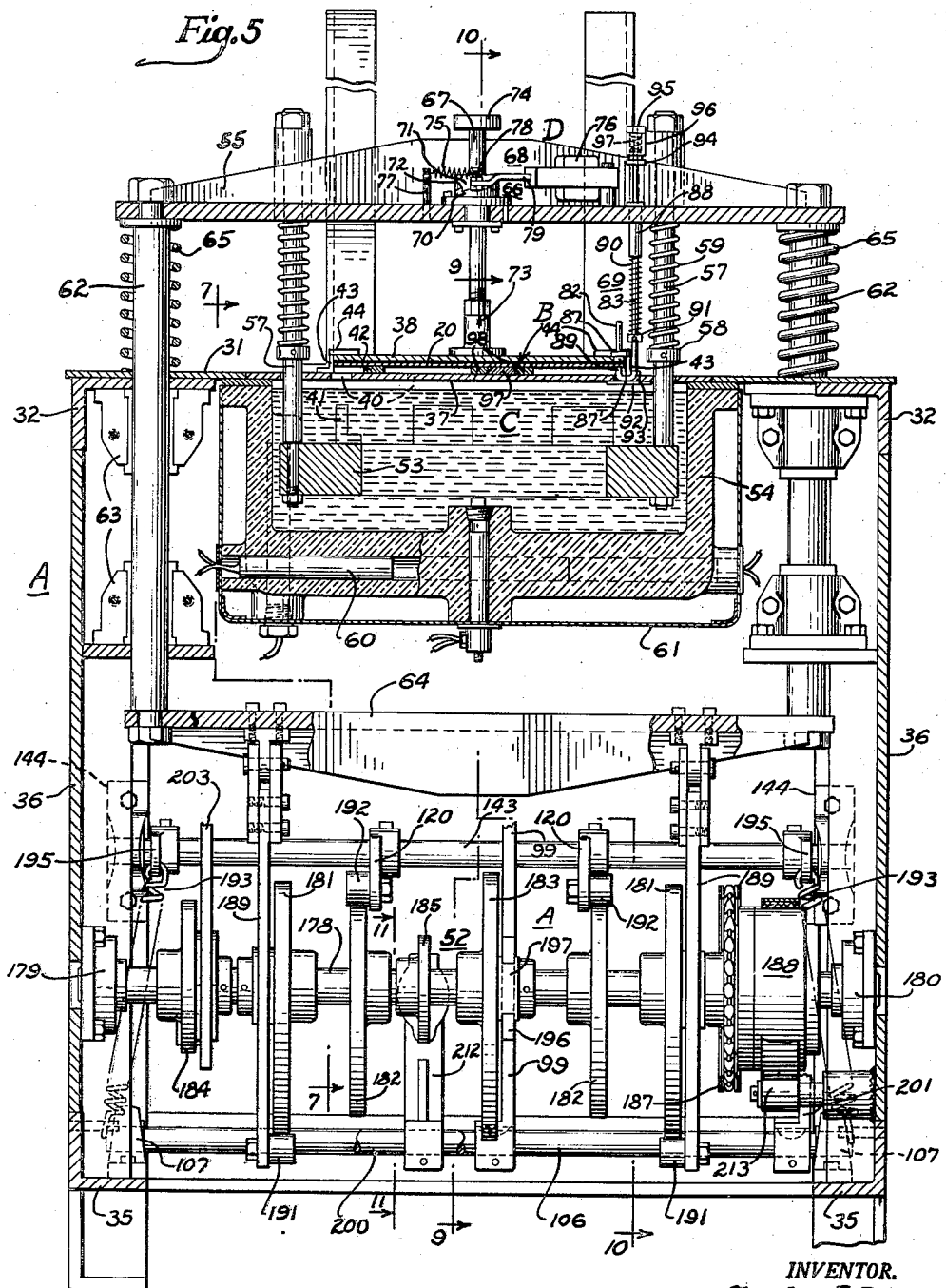

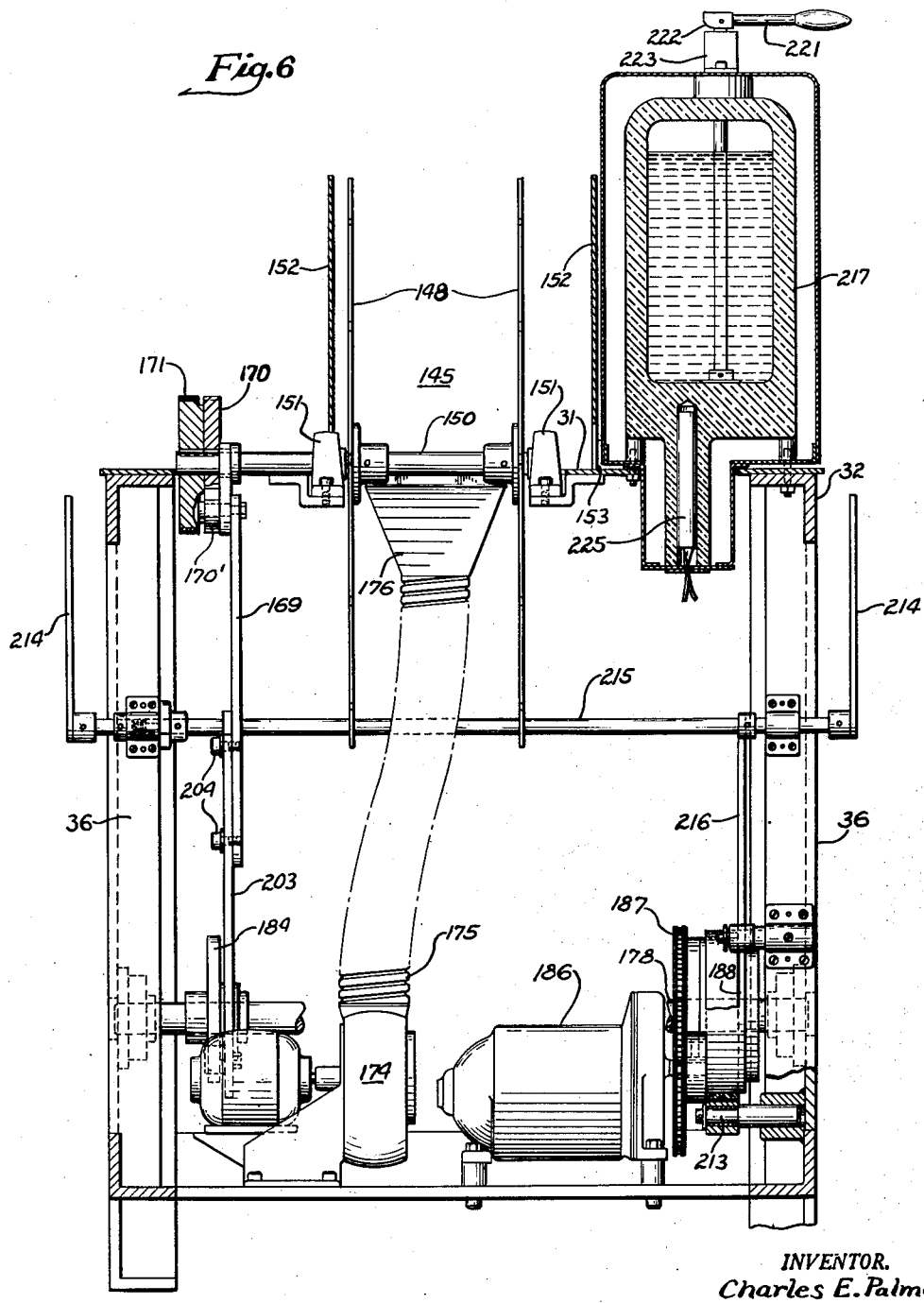

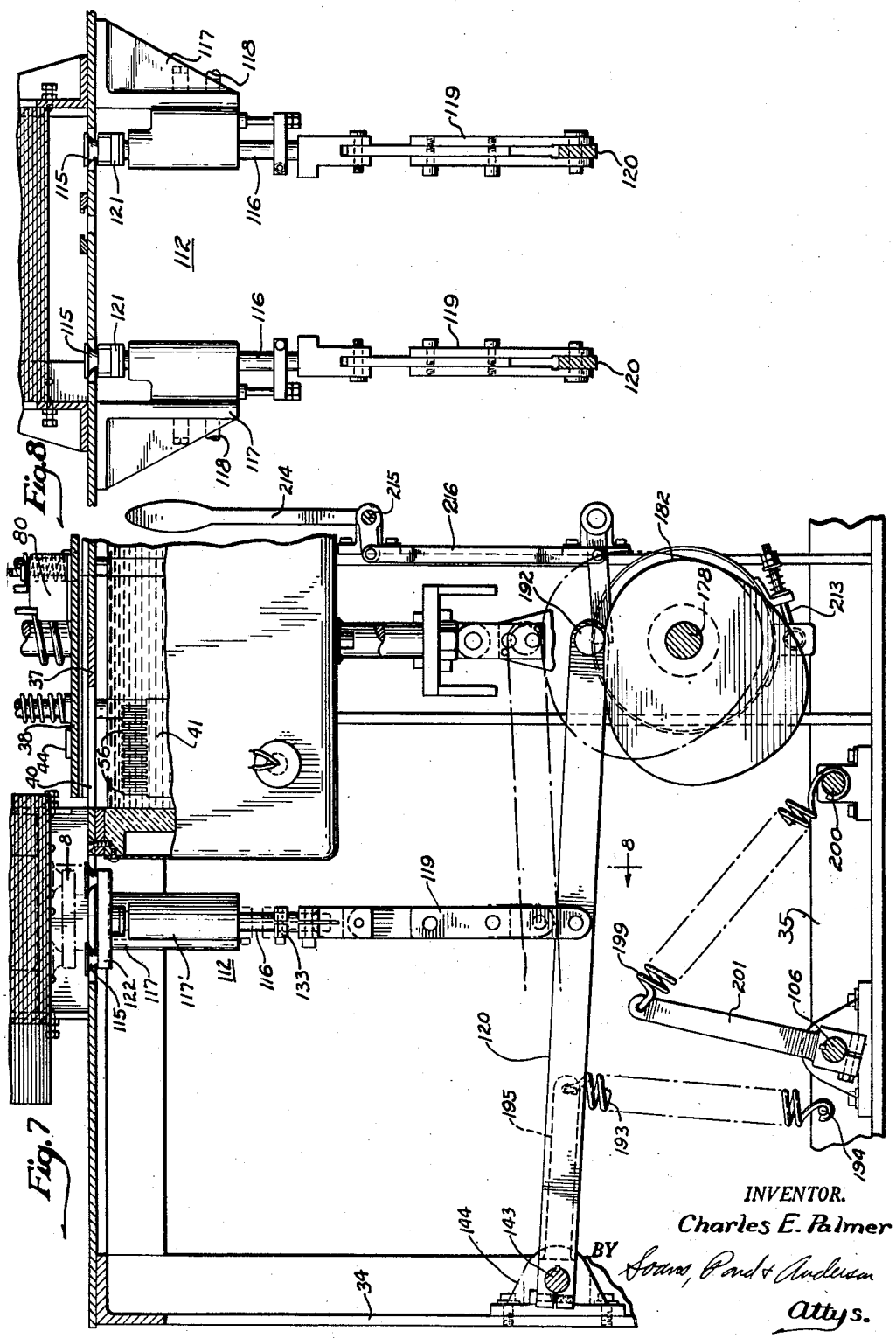

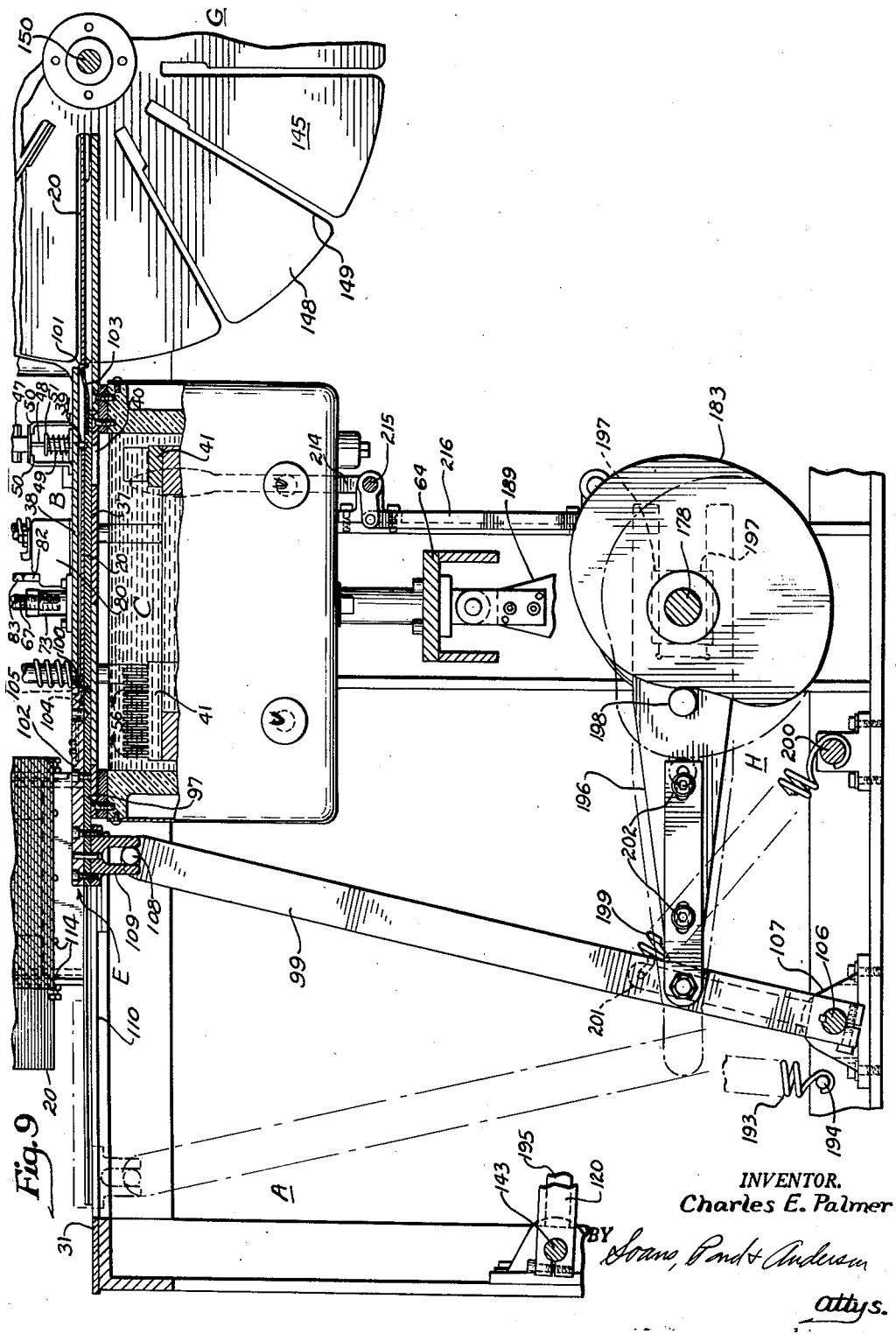

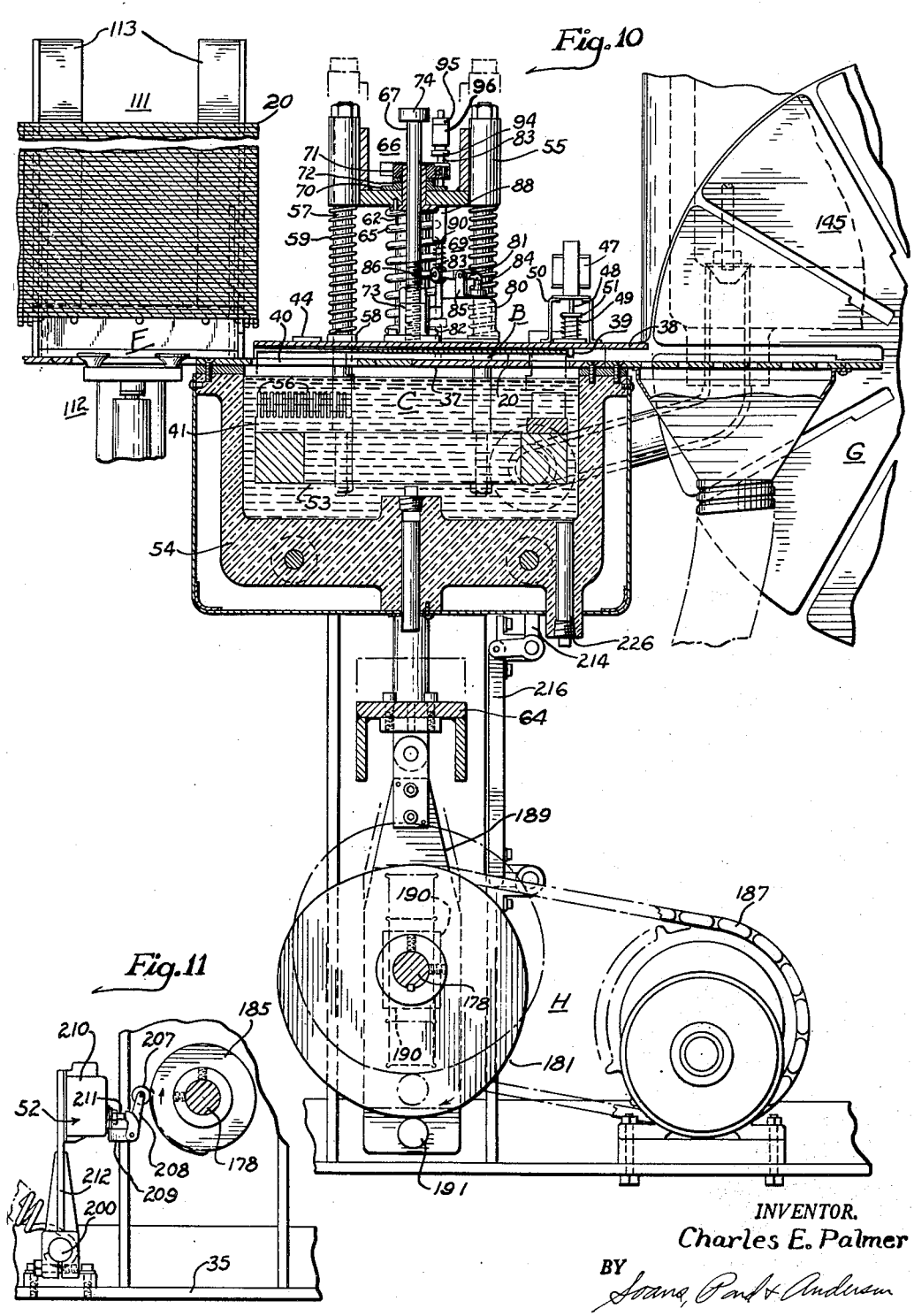

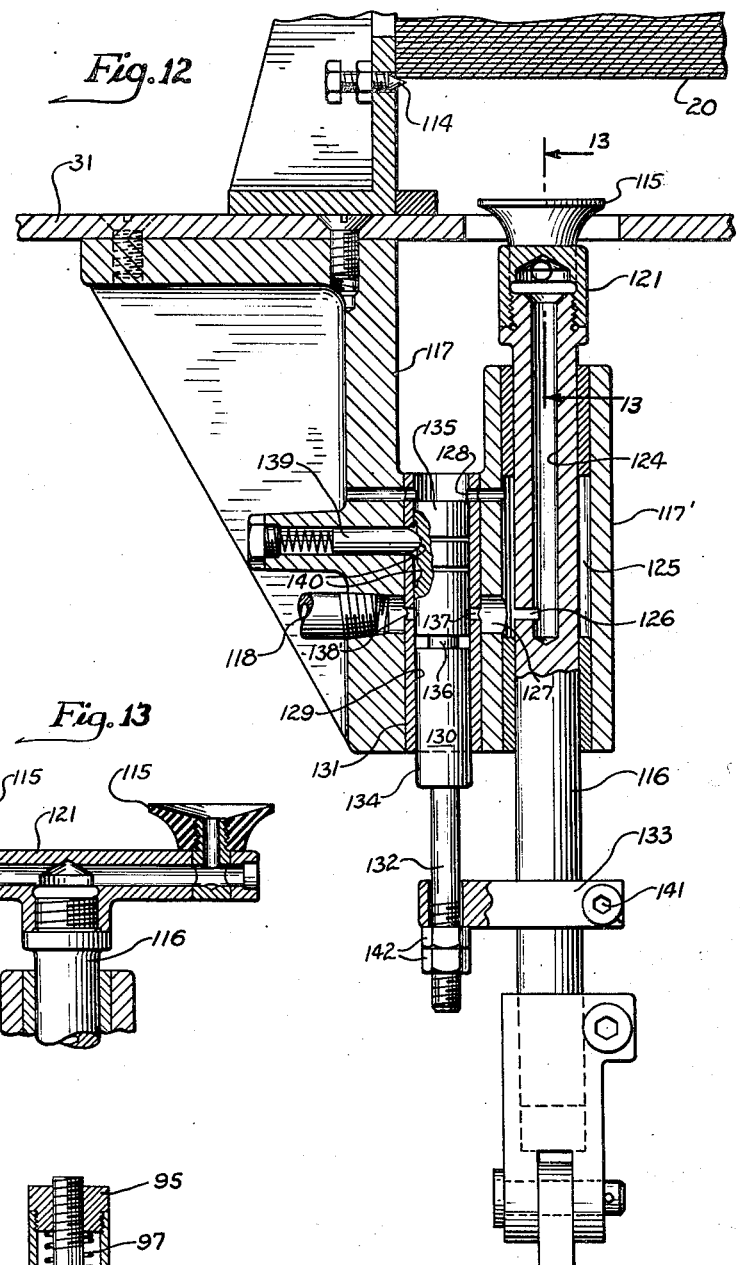

April 17, 1951
C. E. PALMER
2,549,000
APPARATUS FOR APPLYING ADHESIVE TO BOX BLANKS AND THE LIKE
Filed Oct. 9, 1948
10 Sheets-Sheet 10
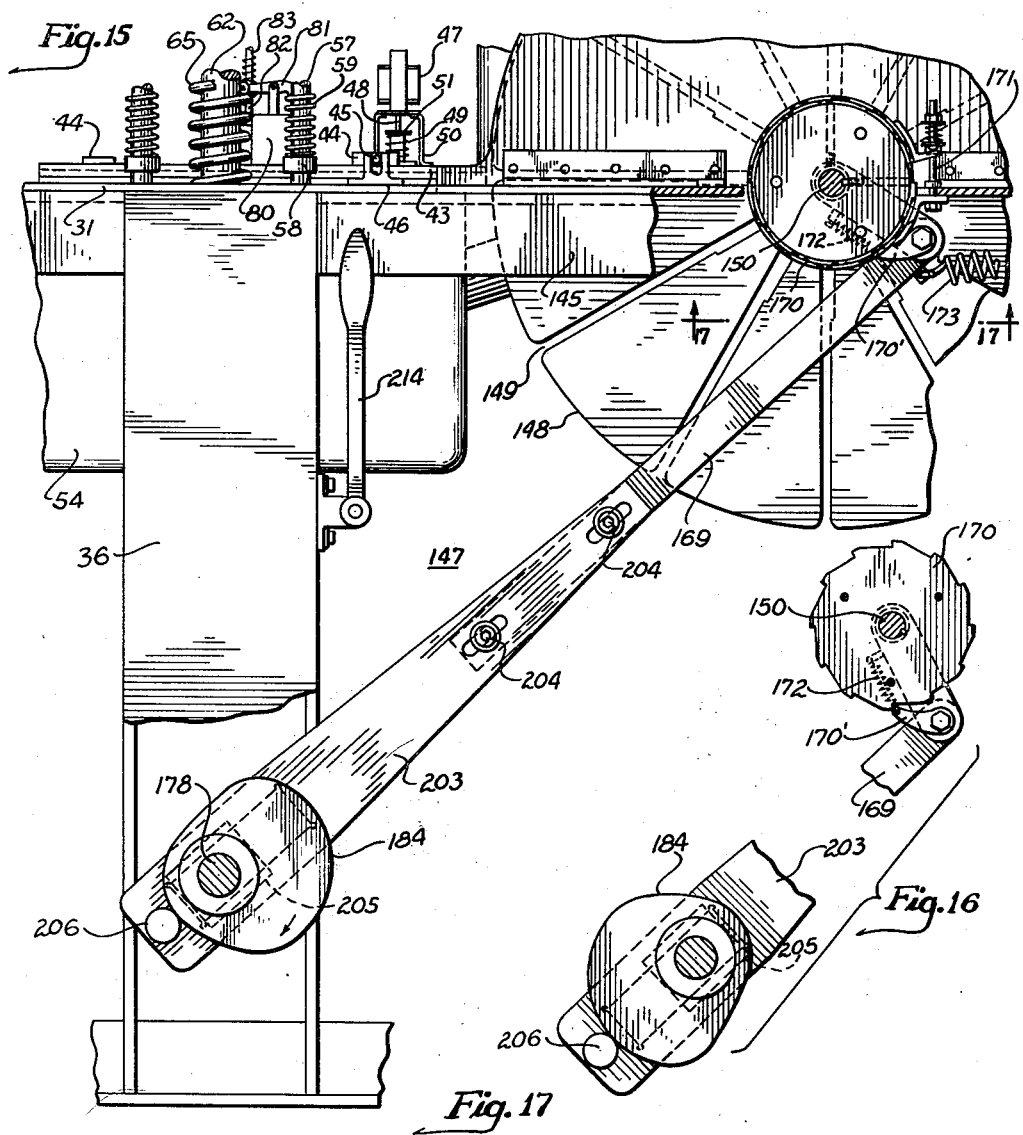
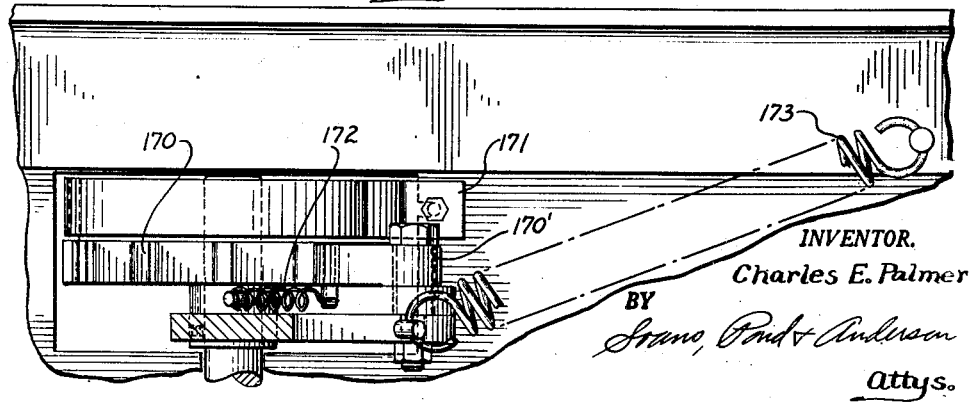
INVENTOR.
Charles E. Palmer
BY
Evans, Pond & Anderson
attys.

Patented Apr. 17, 1951

2,549,000

UNITED STATES PATENT OFFICE 2,549,000

APPARATUS FOR APPLYING ADHESIVE TO BOX BLANKS AND THE LIKE

Charles E. Palmer, Glenview, Ill., assignor, by mesne assignments, to Package Machinery Company, East Longmeadow, Mass., a corporation of Massachusetts Application October 9, 1948, Serial No. 53,692

11 Claims. (Cl. 91—47)

The main objects of this invention are to provide an improved machine for applying to a flat carton blank an adhesive on such portions thereof as are to be overlapped and held together to retain said blank in carton form; to provide an improved machine this kind which applies the adhesive to areas on the blank all on one and the under side thereof as blanks are successively moved into and out of adhesive-applying position; to provide a machine of this kind having an improved construction and arrangement of a carton-blank positioning and discharging means, improved means for supporting the blanks in position for allowing the adhesive to dry, and improved operating and control mechanism for the aforesaid means, all coordinated so that carton blanks placed in a magazine pass in quick and continued sequence to and from the adhesive-applying means, to the adhesive-drying means, and to storage; to provide improved means for momentarily disabling the adhesive-applying means in the event a carton blank fails to be delivered into adhesive-applying position; and to provide a machine of this kind which is comparatively simple in construction, reasonably economical to manufacture, and highly positive in its operation.

In the drawings,

Fig. 1 is a plan view of a carton blank having limited areas to which the machine herein shown and described was designed to apply adhesive;

Fig. 2 is a perspective, fragmentary, and sectionalized view of a carton formed from a blank such as shown in Fig. 1 whereto has been applied a separately-formed bottom insert;

Fig. 3 is a side elevation of a preferred form of machine constructed for applying and drying adhesive on carton blanks of the contour shown in Fig. 1;

Fig. 4 is a plan view of the same;

Fig. 5 is a transverse sectional elevation taken on the line 5—5 of Fig. 3;

Fig. 6 is a transverse sectional elevation taken on the line 6—6 of Fig. 3, some of the parts in the background being omitted for the sake of more clearly indicating the character of the construction;

Fig. 7 is a longitudinal, sectional elevation of the left-hand end portion of the machine shown in Fig. 3, the section being taken on the line 7—7 of Fig. 5 and showing the carton-blank supply and delivery means;

Fig. 8 is a transverse, sectional detail of the suction cup mechanism for the aforesaid means, as viewed from the plane of the line 8—8 of Fig. 7;

Fig. 9 is a longitudinal sectional detail of the left-hand end portion of the machine shown in Fig. 3, the section being taken on the line 9—9 of Fig. 5 and showing the carton-blank advancing means;

Fig. 10 is a fragmentary, longitudinal, sectional detail, the section being taken on the line 10—10 of Fig. 5 and showing the adhesive-applying means;

Fig. 11 is a fragmentary detail of that part of the operating and control mechanism which operates the carton-blank positioning pin, the section being taken on the line 11—11 of Fig. 5;

Fig. 12 is an enlarged sectional detail of one of the suction cup mechanisms for the carton-blank supply and delivery means;

Fig. 13 is a cross-sectional detail of a part thereof, taken on the line 13—13 of Fig. 12;

Fig. 14 is an enlarged, sectional detail of a part of the disabling mechanism for the adhesive-applying means;

Fig. 15 is a fragmentary detail, partly broken away, showing the mechanism for effecting an intermittent operation of the rotary rack of the carton-blank drying means as viewed from the left-hand side of the machine as shown in Figs. 5 and 6;

Fig. 16 is a detail of the aforesaid mechanism; and

Fig. 17 is an underside view of the ratchet and pawl for the mechanism as viewed from the plane of the line 17—17 of Fig. 15.

The herein-shown preferred embodiment of an adhesive-applying and -drying machine is constructed for applying a thermoplastic adhesive to a carton blank 20 such as shown in Fig. 1 which, supplemented by a bottom inset 21, subsequently is converted into a carton of the type shown in Fig. 2, generally used as a container for milk.

The carton blank 20 is scored longitudinally along the lines 22 and transversely along the lines 23 and cut at several points, as indicated at 24, to provide bottom tabs or flaps 25 and top tabs or flaps 26 and 27, at the opposite ends of the portions between the scores 22 which ultimately constitute the four sides of the carton, and a lateral tab 28 along one of these carton side portions.

The bottom tabs 25 are nearly identical in form, as will clearly appear from Fig. 1. The narrow top tabs 26 alternate with the elongated top tabs 27. Both of the latter are provided with partially cut sections which, in the finished carton, are superimposed to permit their subsequent severance first to provide access for filling and later for emptying.

The purpose of this improved machine is to print or apply, at a single operation on one side of the carton blank, strips of thermoplastic adhesive 29 on all those portions of the blank which in folded carton form overlap with each other, and which must be held together and with the bottom inset 21 to form a liquid-tight container. Such strips of adhesive 29 (indicated by stippling) are applied not only to the tabs 25, 26, and 27 but also along the entire width of the carton directly contiguous to the hinge of tabs 25 and along the lateral edge directly opposite the tab 28.

The bottom inset 21, for completing a carton with a folded blank of the above character, has the portions along the four sides upset and doubled back to provide an inverted V-shaped perimetrical flange 30 the outer leg of which flange is adhered to the sides of the carton directly inward of the hinge of the end tabs 25.

The herein-shown preferred embodiment of an adhesive-applying and -drying machine embodying this invention comprises a supporting frame A mounting a carton-blank print-positioning means B wherewith is associated an adhesive-applying means C, with its disabling mechanism D, whereto a carton-blank-advancing means E delivers carton blanks received from a carton-blank supply and delivery means F and wherefrom said carton blanks, applied with adhesive, are discharged by said carton-blank-advancing means E to an adhesive-drying means G, all through the coordinated action of an operating and control mechanism H.

The supporting framework A provides a platform 31, whereon is mounted all of the above-mentioned means except the operating and control mechanism H, resting upon the side and end angle bars 32 and 33 which are supported by legs 34 at the four corners. Between the legs 34, below the side bars 32, extend the lateral horizontal cross-bars 35 between which and the side bars 32 extend the intermediate vertical side bars 36. These lateral cross-bars 35 and the intermediate vertical bars 36 provide the main support for the operating and control mechanism H.

The carton-blank print-positioning means B comprises a supporting plate 37, a platen 38, and a reciprocable positioning pin 39.

The plate 37 is a section of the platform 31 located rearwardly of the transverse median of the platform 31. The plate 37 is provided with openings 40 through which printing pads 41, of the adhesive-applying means C, apply adhesive to the underside of the carton blank 20 positioned intermediate the plate 37 and the platen 38. The position and size of these openings is such as to expose to the adhesive-applying means C those portions of the carton blank to which the adhesive has to be applied, as indicated by the stippled strips 29 in Fig. 1, in order to secure the blank 20 in folded position to constitute a carton as shown in Fig. 2. A strip 42 (see Fig. 5) on the top of the plate 37 extending longitudinally of the platform 31 coacts with the guide rails of the carton-blank advancing means E to hold cartons 20 spaced from the plate 37 and contiguous to the platen 38.

The platen 38, as will be most clear from Fig. 4, in much of its contour is quite similar to the contour of the carton blank shown in Fig. 1.

The platen is supported on and between angle bars 43 (see Fig. 5) by small pads 44 attached to the upper face of the platen adjacent the four corners thereof. The pads rest upon the upper edge of the vertical part of the angle bars 43. The pads 44 at the forward corners of the platen are provided with pins 45 (see Figs. 3, 4, and 15) which are received in the bifurcated brackets 46, attached to the platform 31. These secure the platen against displacement in the direction of the travel of the carton blank through the machine but do not interfere with an elevation of the platen 38 by the adhesive-applicator-means disabling-mechanism D to be subsequently described.

The carton-blank positioning-pin 39, most clearly shown in Figs. 3, 9, 10, and 15, comprises a solenoid 47, the armature 48 of which extends through the platen 38 to provide a detent in the path of the carton blank 20, normally retracted from the path of the carton by a spring 49.

The solenoid 47 is supported on a bracket 50 on the top of the platen 38 adjacent the forward edge thereof. The solenoid armature 48 extends down through an opening in the platen 38 so that the lower end of the armature extends across the space between the plate 37 and the platen 38.

Between a shoulder 51 and the platen 38 is located the spring 49 which normally retracts the armature 48 so as to remove the lower end thereof from the path of the carton blank 20. When the solenoid 47 is energized, by a switch mechanism 52 (see Fig. 11) forming a part of the operating and control mechanism H, the armature 48 is depressed so as to move the lower end thereof into the path of the carton blank 20, so as to arrest the forwardly-moving carton blank and insure the proper positioning of the blank for the application of adhesive by the adhesive-applying means C.

The adhesive-applying means C comprises a number of printing pads 41 mounted on a frame or element 53 suspended in an adhesive tank or container 54 from a reciprocating cross-bar 55. The actuation of the cross-bar 55 by the operating and control mechanism H later to be described, results in the application of adhesive to the carton blanks 20.

The printing pads 41 are in the form of blocks slotted to provide a series of parallel projections presenting narrow printing surfaces 56 (see Figs 7, 9, and 10) by means of which strips of thermoplastic adhesive 29 are applied to the carton blanks 20 (see Fig. 1). These printing pads 41 are of such a form and so arranged on the frame 53 that the printing surfaces 56 will apply adhesive to the carton blank along the areas hereinbefore described and indicated by 29 in Fig. 1.

The frame 53 is in the form of a rectangular square ring frame bolted to the ends of rods 57, which are suspended from the cross-bar 55. Collars 58 are secured to the rods 57 above the platform 31 between which and the cross-bar 55 are arranged compression springs 59. These springs 59 permit a movement of the cross-bar 55 relative to the rods 57 when the collars 58 contact the platform 31 during the downward stroke of the cross-bar 55. Accordingly, the stroke of the frame 53 is less than the stroke of the cross-bar 55.

The tank or container 54 is of material of low heat conductivity, preferably a ceramic. It is suspended from the underside of the platform 31. Electrical heating coils 60 (see Fig. 5) are operated to keep the adhesive in the tank in an appropriate fluid condition. A protective casing 61 surrounds the tank 54.

The cross-bar 55 is bolted to the upper ends of rods 62 slidably mounted in bearings 63 secured to the framework A. At their lower ends the rods 62 are bolted to a second cross-bar 64 which is connected to the operating and control mechanism H, as will appear more clearly hereinafter. Springs 65 are interposed between the cross-bar 55 and the platform 31 and coact with the related part of the operating and control mechanism H to effect the proper reciprocation of the cross-bar 55 on which is arranged the adhesive-applying disabling mechanism D.

The disabling mechanism D for the adhesive-applying means C is provided so that in the event a carton blank 20 fails to be positioned between the plate 37 and the platen 38 no thermoplastic material will be impressed on the underside of the platen thereafter to be transferred to the upper face of carton blank 20 subsequently delivered to the print-positioning means B.

This disabling mechanism D comprises a pair of relatively shiftable abutments 66 (see Fig. 5) associated with the cross-bar 55 of the adhesive-applying means C and a post 67 mounted on the platen 38. The relative shifting of the abutments 66 is controlled by an operating means 68 under the influence of an actuating mechanism 69. (Fig. 4.)

The relatively adjustable abutments 66 are in the form of a pair of collars 70 and 71 (see Fig. 5) the opposed faces of which are provided with interfitting ratchet teeth 72. The collar 70 is fixed to the cross-bar 55 of the adhesive-applying means C whereas the collar 71 is free to rotate and slide on the post 67.

The post 67 is adjustably secured to a hub 73 secured to the platen 38 and mounts a collar 74 or abutment at its upper end. The collar 74 is positioned on the post 67 so that when the collars 70 and 71 are in their normal relatively-retracted positions, as shown in Fig. 5, the distance between the collars 71 and 74 will be slightly greater than the stroke of the cross-bar 55. Accordingly, the collar 71 will barely miss contacting the collar 74 as the cross-bar 55 passes through the crest of its stroke incident to bringing the printing pads 41 into printing position. However, when the collar 71 is turned on the collar 70 (due to the absence of a carton blank in printing position) the ratchet teeth 72 will elevate the collar 71. This lessening of the distance between the collars 71 and 74 will be sufficient to cause the collar 71 to contact the collar 74 as the cross-bar 55 approaches the crest of its stroke and, as the cross-bar 55 passes the crest of its stroke, result in a lifting of the platen 38 so as to prevent an application of adhesive thereto when a carton blank is not in printing position.

The abutment operating means 68 comprises a spring 75 and a solenoid 76 which cooperatively determine the position of the collar 71 with respect to the collar 70 (see Figs. 4 and 5).

The spring 75 connects a post 77 on the cross-bar 55 with a finger 78 on the collar 71. This spring normally pulls the collar 71 to locate the ratchet teeth 72 in their relatively retracted positions as shown in Fig. 5.

The solenoid 76 has its armature connected by a link 79 (see Fig. 4) to the finger 78 so that energization of the solenoid effects a shifting of the collar 71 relative to the collar 70 and thereby causes the ratchet teeth 72 to elevate the collar 71 on the post 67, with the result above explained.

The actuating mechanism 69, for causing an energization of the solenoid 76, comprises a switch means 80 (see Fig. 10) connected to a switch lever 81 hinged to a rod 82 positioned on the platen 38 for actuation by a feeler or tripper rod 83 when the adhesive applying means C is operated in the absence of a carton blank in printing position between the plate 37 and platen 38.

The switch 80 is of a conventional nature. It is mounted on the platen 38 with its push button 84 contacted by the lever 81. The lever 81 is fulcrumed on a bracket 85 (see Fig. 10) mounted on the housing of the switch 80, and hinged at 86 to the upper end of a rod 82.

The rod 82 is shouldered at 87 to rest on the platen 38 with the end 87' below the shoulder extending through an opening in the platen 38, as shown most clearly in Fig. 5.

The feeler or tripper rod 83 is slidably mounted in a sleeve 88, secured to the cross-bar 55. The end of the hook 89 is disposed in axial alignment with the lower end 87' of the switch rod 82 (see Fig. 5) and normally spaced away from said rod 82 a distance substantially equal to the thickness of a carton blank 20. A spring 90 embracing the rod 83 between the sleeve 88 and a collar 91 fixed to the rod 83 normally urges the said rod against a plate 92 closing an opening 93 in the plate 37 and into which opening 93 the bend in the hook 89 is normally depressed by the spring 90.

At its upper end the tripper rod 83 mounts a pair of bushings 94 and 95 (see Fig. 14) at opposite ends of a sleeve 96 and between which and within the sleeve is a spring 97. The bushing 94 is slidable on the rod 83 with its flange 94' within the sleeve 96. At its lower end the bushing 94 supports a ring 94''. The bushing 95 is fixed to the end of the rod 83 and also in the end of the sleeve 96. The spring 97 acting between the bushings 94 and 95 tends to hold the bushings separated as shown in Fig. 14. The ring 94'' on the bushing 94 is spaced above the flange on the collar 88 a distance slightly less than the distance between the collars 71 and 74.

Assuming that a carton blank is in printing position and with reference to Figs. 5, 10 and 14, the operation of the last described mechanism is as follows: Normal upward movement of the cross head 55 elevates the printing blocks into printing engagement with the underside of the carton blank 20. During such upward movement, the cross head slides freely upwardly on the rod 83 which is held against upward movement by engagement of its hooked end 89 with the underside of the carton blank. However, during a terminal portion of such upward movement, the upper end of the bushing 88 engages the flange or ring 94'' and elevates the bushing 94 against the resistance of the spring 97 which yields and is compressed. In the absence of a carton blank in said printing position, the hooked end 89 of the rod 83 will be elevated into engagement with the lower end portion 87' of the switch actuating rod 82 just before the printing blocks reach their normal printing position. The spring 97 in the sleeve 96 is strong enough to transmit the terminal portion of the upward movement of said cross head 55 to said rod 83 through the upper bushing 95. The upward movement thus imparted to the rod 83 and by the rod 83 to the rod 82 is sufficient in extent to enable the rod 82 to rock the switch arm 81 sufficiently to close the switch and thereby actuate said ratchet toothed members 71 and 72 to elevate the platen as already explained to thereby prevent printing on the underside of the platen. The screw threaded mounting of the collar 95 on the rod 93, permits vertical adjustment of the collar 95, the sleeve 96 and parts anchored thereto for the purpose of timing the functioning of the ratchet toothed members 71 and 72 relative to the movement of the cross bar 55 through the crest of its stroke.

The carton-advancing and -placing means E has the two-fold function of simultaneously advancing carton blanks from the carton-supply and -delivery means F into printing position and from printing position into the carton-drying means G. The carton-advancing and -placing means comprises a bar 97 slidably mounted on the table plate 31 and between guide rails 98 for actuation by a rocker arm 99 (see Figs. 4, 5, 9 and 10).

The bar 97 is provided with shoulders 100 and 101 (see Fig. 9) which during a forward movement of the bar 97 are adapted to simultaneously engage and push a carton blank into printing position and discharge a printed one into the carton-drying means G.

The shoulder 100 (see Fig. 4) is the end of a plate 102 secured to the top of the bar 97. The shoulder 101 (see Fig. 9) is formed by the bent-over end of a leaf spring 103 secured to and extending slightly beyond the forward end of the bar 97. Being in the form of a leaf spring, the shoulder 101, during the rearward movement of the bar 97, is depressed by a carton blank 20 in printing position and travels along the under face of said carton. When the bar 97 reaches the extreme limit of its rearward movement the spring 103 elevates the shoulder 101 into position to contact the rear edge of a carton in printing position preparatory to discharging it when the bar 97 is again advanced by the rocker arm 99.

A similar leaf spring 104 is secured to the underside of the platen 38 adjacent the rear edge thereof and directly beside the path of the plate 102 on the bar 97. At its forward end the spring 104 is turned upwardly as shown in dotted lines in Fig. 9, to provide a shoulder 105. Such shoulder is adapted to engage the rear edge of a carton blank 20 in printing position and prevent the retraction thereof from printing position when the bar 97 is withdrawn by the rocker arm 99 preparatory to repeating the function of simultaneously advancing a carton blank into printing position and discharging a printed blank from printing position into the drying means G.

The guide rails 98 are secured to the platform 31 medially of the lateral sides of the platform 31. They extend from near the rear end of said platform to a point a little short of the forward edges of the plate 37 and platen 38. In addition to constituting a track for the bar 97 they coact with the bar 42 to support a carton blank 20 in printing position as clearly will appear from Fig. 5.

The rocker arm 99 is secured to a shaft 106 journaled in bearings 107 on the lateral side rails 35 of the supporting framework A. At its upper end the rocker arm is provided with a pin 108 which engages a bifurcated bracket 109 (see Fig. 9) secured to the rear underside of the feed bar 97 and extending through a slot 110 in the platform 31 between the guide rails 98. As will be explained later, the rocker arm 99 is connected to the operating and control mechanism H for the purpose of causing the bar 97 to advance carton blanks delivered to the bar 97 from the carton-supply and -delivery means F.

The carton-supply and -delivery means F comprises a carton-blank magazine 111 from which carton blanks are drawn one at a time by the reciprocating suction cup mechanism 112 and delivered into position to be advanced into printing position by the above-described carton-advancing and -placing means E.

The magazine 111 comprises angle iron guides 113 which extend upwardly from the platform 31 to position a stack of the carton blanks for delivery to the printing mechanism as above explained. The carton blanks are supported in the guides by a plurality of pins 114 threaded through the lower ends of said guides and through suitable plates which connect the lower end portions of said guides as shown in Fig. 3. These pins 114 are adjustable inwardly and outwardly so as to permit adjustment of the extent to which the inner ends of these pins will extend under the lowermost carton blank in the magazine.

This suction cup mechanism 112 (see Figs. 4, 7, 8, 12 and 13) comprises two pairs of suction cups 115 supported at the upper ends of reciprocating rods 116 slidably mounted on brackets 117 through which the valve-controlled channels and chambers of said cups are connected to conduits 118 leading to a suitable suction pump (not shown). Links 119 connect said rods to rocker arms 120.

The cups 115 are of a more or less conventional form and construction. Each pair is mounted on a head 121 attached transversely at the upper end of the rod 116 the channel 122 of which connects the orifices 123 in the cups with a channel 124 formed in the upper ends of the rods 116. The channel 124 communicates with a chamber 125, formed in a hub or boss 117' of the bracket 117, through a slot or aperture 126. The chamber 125 in turn communicates through orifices 127 and 128 with the valve-controlled chamber 129 from which leads the conduit 118 and which is open to the atmosphere at its upper end.

The valve 130, controlling communication between the chamber 129 and the conduit 118, is an elongated cylinder slidably mounted in a sleeve 131 secured within the bracket 117 and forming the chamber 129. A stem 132 on the valve 130 and an arm 133 on the rod 116 operatively connect the valve 130 with the rod 116 so that the shifting of the valve 130, between its two positions for opening and closing communication between the cups 115 and the conduit 118, is synchronized with the reciprocation of the rod 116.

The valve 130 is divided into two sections 134 and 135 by an annular recess 136 which recess is alternately brought into and out of registration with orifices 137 and 138 in the sleeve 131 for controlling communication between the suction conduit 118 and the bracket chamber 125. The annular recess 136 is so located that when the valve section 135 is positioned to close the sleeve orifices 137 and 138 the bracket orifice 128 is open to the atmosphere and vice versa.

The valve 130 is yieldingly held in either of its positions by a spring-pressed pin 139 the end of which seats in one or another of the annular grooves 140 formed in the valve section 135 intermediate the annular recess 136 and the upper end of the valve 130.

The arm 133 is adjustably clamped to the post 116 by a bolt and nut 141 but is free to slide on the valve stem 132. Contact of the arm 133 alternately with the end of the valve section 134 and nuts 142 on the valve stem 132 effects the opposite shifting of the valve 130. By adjusting the position of the arm 133 on the rod 116 and the nuts 142 on the valve stem 132 the shifting of the valve 130 can be acceptably synchronized with the reciprocation of the rod 116 and thereby have the suction on a carton applied and released at the correct points in the reciprocation of the cups 115.

The link mechanism 119 is extensible so as to regulate the stroke of the rod 116. The rocker arm 120 is connected to a rocker shaft 143 mounted in bearings 144 secured to the supporting-frame posts 34 at the left-hand end of the framework A. At its opposite end the rocker arm is related with the operating and control mechanism H hereinafter to be described.

The adhesive-drying means G comprises a revolving rack 145 and a link belt conveyor 146 so arranged and their operation so synchronized by an operating means 147 that cartons 20, with the adhesive applied thereto, discharged from the printing position are first received by the revolving rack 145 and subsequently discharged therefrom to the conveyor 146 wherefrom they are ultimately discharged for storage or shipment.

The rotating rack 145 comprises a pair of disks 148 having a plurality of radially-disposed slots 149 extending axially inwardly from the circumferential edges thereof. These disks are fixed in spaced relationship on a shaft 150 (see Fig. 6) journaled in bearings 151 so positioned on the platform 31 as to successively bring the pairs of slots 149 into horizontal alignment with the space between the plate 37 and platen 38 (see Figs. 3, 9, 10, and 15) to receive printed carton blanks as they are discharged from printing position by the carton-blank advancing-means E. Arcuate-shaped, vertically-disposed guide plates 152 are anchored to the platform 31 by angle bars 153 on opposite sides of the rotating rack 145 (see Figs. 3 and 4). These guide plates are spaced apart horizontally a distance equal to the width of the carton blank 20 (see Fig. 4). Between these plates 152, near the forward end of the platform 31, is a retaining wall 154 which prevents centrifugal displacement of the printed cartons as they are revolved from receiving position into a position to be discharged onto a transfer chute 155 leading to the drying conveyor 146.

The drying conveyor 146 comprises a pair of parallel chains on link belts 156 to the links of which are attached a series of rather closely-spaced, inclined shelves 157. The chains 156 operate over sprockets 158 and 159 at the ends of supports 160 (see Fig. 3) secured to the front end of the supporting framework A by lower and upper pairs of arms 161 and 162.

The shelves 157 are secured one to each of the links of the chains 156 at an incline substantially parallel to that of the transfer chute 155 on the receiving side of the conveyor so that the printed cartons discharged onto the chute 155 are successively delivered by gravity to the shelves 157 during the synchronized movement of the rack 145 and conveyor 146 by the operating means 147.

A guard 163 is arranged along the front upper portion of the conveyor 146 so as to retain the cartons in place until the shelves 157 successively come into registration with discharge chute 164.

The operating means 147, for the carton-drying means G, comprises suitable chain drives 165 and 166 (see Figs. 3, 4 and 6) connecting a jack shaft 167 respectively with the shaft 150 for the revolving drying rack 145 and the shaft for the sprocket 158 of the drying conveyor 146. The ratios of the sprockets for these chain drives is such as to bring successive slots 149 in the revolving drying rack 145 and successive shelves 157 on the conveyor 146 simultaneously into registration with the transfer chute 155.

The transfer chute 155 is tiltably mounted at 168 (see Fig. 3) on the framework A in a position best adapted to receive cartons by gravity from the rack 145 and deliver them to the conveyor 146. Its angularity may be adjusted to properly ensure this gravity transfer from the rack 145 to the conveyor 146.

The carton-dryer operating means 147 (see Figs. 15 to 17) is connected to the operating and control mechanism H through the medium of an arm 169 having pivoted thereon at its upper end, a pawl 170' which engages a ratchet 170 keyed to the shaft 150. An adjustable tensioning device or brake 171 prevents rotary movement of the rack 145 incident to its momentum resulting from the positive driving forces applied thereto through the agency of said pawl 170' and ratchet 170. A spring 172 normally urges the pawl 170' into contact with the ratchet 170. Another spring 173 normally urges the arm 169 toward the upper end of its stroke and maintains its effective relationship with the operating and control mechanism H to which the arm 169 is connected.

To facilitate the drying of the adhesive on each carton blank as it is received by the rotary drying rack, a motor-driven blower 174 (see Figs. 3, 4 and 6) is connected by a conduit 175 to a hood 176 attached under the platform 31 directly forward of the printing plate and platen 37 and 38 and between the disks 148. A series of apertures 177 (see Fig. 4) formed in the platform 31 permits the passage of air from the blower hood to the underside of the printed carton blank as it is moved into position in a pair of slots 149 registering with the space between the printing plate 37 and platen 38. The air current is thereby more or less diffused and prevented from blowing the adhesive across the surface of the carton blank.

The operating and control mechanism H comprises a main drive shaft 178 journaled in bearings 179 and 180 mounted on the vertical side plates 36 and whereto are rotatively connected the various cams which effect the operation of the several means hereinbefore described. These cams include a pair of cams 181 which operate the adhesive-applying means C, a pair of cams 182 which operate the carton-blank supply- and delivery-means F, a cam 183 which operates the carton-advancing and -discharging means E, a cam 184 which operates the adhesive-drying means G, and a cam 185 for actuating the switch mechanism 52 for the carton-positioning pin 39. These various cams are shaped and angularly disposed relative to each other to secure the proper sequential operation of the several means, as will appear more clearly in a subsequent description of the "operation" of this machine.

The shaft 178 is driven by a motor 186 (Fig. 6) through the medium of a chain drive 187 which is controlled by a suitable clutch mechanism 188.

The form of the pair of cams 181 for operating the adhesive-applying means C is most clearly shown in Fig. 10. Connecting bars 189 (see Figs. 3 and 5 also) hinged at their upper ends to the cross-bar 64 are slidably mounted on bearing blocks 190 journaled on the shaft 178. A roller 191 at the lower end of each of the connecting bars contacts with the underside of the respective cams 181. The rollers 191 are held in contact with the underside of the cams 181 by the springs 65 embracing the rods 62 intermediate the cross-bar 55 and the platform 31.

The form of the cams 182 for operating the carton-blank supply and delivery-means F is most clearly shown in Fig. 7. Rollers 192, on the forward ends of the rocker arms 120, are held in contact with the cams 182 by a spring 193. This spring is anchored to a pin 194 on one of the lateral horizontal cross-bars 35 and connected to an arm 195 secured to the rock shaft 143 to which the rocker arms 120 are connected.

The form of the cam 183 for operating the carton-blank advancing-means E is most clearly shown in Fig. 9. A connecting bar 196 (see Fig. 3 also) is hinged at its rear end to the rocker arm 99 and at its forward end is slidably mounted on a bearing block 197 journaled on the shaft 178. A roller 198 on the pitman 196 is held in contact with the cam 183 by a spring 199. Said spring 199 is anchored at its lower end to a stationary shaft 200 carried by the longitudinal frame members 35, and said spring has its upper end connected to an arm 201 which is secured to the shaft 196 whereto is keyed the rocker arm 99. The pitman 196 is made in adjustably connected sections clamped together by suitable means 202 (see Fig. 9) whereby the stroke of the rocker arm 99 may be adjusted to ensure correct reciprocation of the bar 97 in order to effect proper delivery of carton blanks 20 to and from the printing position between the plate 37 and the platen 38.

The form of the cam 184 for operating the drying mechanism G is most clearly shown in Figs. 15 and 16. A connecting bar 203 is adjustably clamped to the arm 169 by suitable means 204 and slidably supported on a bearing block 205 journaled on the shaft 178. A roller 206 on the lower end of the connecting bar 203 is held in contact with the cam 184 by the hereinbefore-described spring 173. The adjusting means 204 allows an adjustment of the stroke of the arm 169 to ensure proper action of the pawl 170 and ratchet 171 in operating the drying means G.

The form of the cam 185 for operating the switch 52 which controls the carton-positioning pin 39 is most clearly indicated in Fig. 11. This cam engages a roller 207 journaled on one arm of a bell crank lever 208 hinged on a bracket 209 fixed to a housing 210 wherein is contained the adjustable contacts which control current to the solenoid 47 for the carton-positioning pin 39. The other arm of the bell crank lever 208 is positioned to press against a spring-actuated switch button 211 which keeps the roller 207 in contact with the cam 185. The switch housing 210 is mounted on a bracket 212 (see Fig. 11) anchored to the stationary shaft 200.

The clutch mechanism 188 may be of any conventional construction, preferably being provided with a brake band mechanism 213 adapted to instantly check the rotation of the shaft 178 when the clutch is cut out and thereby precluding movement of any of the hereinbefore-described means following a retraction of the clutch mechanism.

The clutch mechanism 188 is controlled by a pair of levers 214 mounted at opposite ends of a rock shaft 215 which is connected to the clutch mechanism 188 by a link 216. The handle levers 214 being located on opposite sides of the supporting framework A makes it possible for an operator to control the operation of the machine from either side.

Replenishment of the fluid cementitious material for the container 54 is obtained from a supply reservoir 217 mounted on the platform 31 at one side of the rotary drying rack 145. This reservoir is connected to the container 54 by a conduit 218 controlled by a valve 219 (see Fig. 3) which is normally urged into its closed position by a spring 220. A lever 221, pivoted at the upper end of the stem for the valve 219, is formed with a cam 222 which, acting on the bracket 223, retracts the valve 219 when the handle 221 is moved into a vertical position. A suitably capped filling hole 224 is provided in the top of the reservoir 217. Said reservoir is also provided with one or more heating elements 225 (Fig. 6) for maintaining the adhesive, if of thermoplastic character, in liquid form and both the main tank 54 and reservoir are provided with suitably plugged drain holes 226 and 227 respectively as indicated in Figs. 10 and 4 respectively.

The operation of the herein-shown, preferred, form of machine constructed in accordance with this invention is as follows:

A stack of carton blanks 20, of the form shown in Fig. 1, is placed in the magazine 111 with the faces, shown in Fig. 1, downward and with the tabs 26 forwardly disposed and the tabs 27 rearwardly disposed. Obviously the pins 114 will need to be adjusted to ensure a proper support for whatever stack of blanks is placed in the magazine 111 and yet at the same time to permit the ready extraction of the blanks one at a time by the suction cup mechanism 112.

With the machine otherwise in readiness for operation one of the levers 214 would be shifted to throw in the clutch 188 which would start the rotation of the shaft 178. The sequence of the successive and, at times, simultaneous actuation of the several means and mechanisms, hereinbefore described, effected by the various cams keyed to the shaft 178 can be explained best by beginning with the carton-blank supply and delivery means F and following the carton blank through the machine.

The rotation of the cams 182 (see Fig. 7) elevates the rocker arms 120 and moves the suction cups 115 up into contact with the lowermost carton in the magazine 111. The upward movement of the rods 116 results in the arm 133 contacting the valve 130 and shoving it upwardly to bring the annular recess 136 into registration with the apertures 137 and 138. This opens communication between the vacuum line 118 and the cups 115, causing the lowermost carton blank 20 to adhere to the cups 115.

The continued rotation of the cams 182 effects a retraction of the rods 116 through action of the spring 193 which holds the rollers 192 on rocker arms 120 in contact with the cams. Such retraction of the rods 116 withdraws a carton from engagement with the pins 114 and lowers the carton blank onto the guide bars 98 of the carton-advancing means E.

During the initial part of this retractive movement of the rods 116 the spring-pressed pin 139 (see Fig. 12), engaging the upper of the annular grooves 140, will retain the valve 130 in the position which affords communication between the vacuum line 118 and the cups 115 through the channels 122, 124, slot 126, chamber 125, and apertures 127, 137, 136 and 138. As the rod 116 approaches the lower limit of its stroke the arm 133 is brought into contact with the nuts 142, on the valve stem 132, whereupon the valve 130 is lowered and moves the annular recess 136 out of registration with the apertures 137 and 138. Thereupon communication between the vacuum line 118 and the cups 115 is cut off. However, this lowering of the valve 130 uncovers the aperture 128 and permits communication between the cups 115 and the atmosphere through the channels 122 and 124, slot 126, chamber 125, and aperture 128. This opening of the cups 115 to the atmosphere will effect a release of the carton from the cups to permit an advance thereof by the carton-advancing means E.

The valve 130 will be retained in its lowermost position, until the cycle above described is repeated, by the engagement of the spring-pressed pin 139 in the upper one of the grooves 140.

As the cams 182 complete the retraction of the suction cup mechanism 112, and effects the release of a carton blank from the cups 115, the cam 183 initiates a forward movement of the bar 97 through the action of the rocker arm 99 (see Fig. 9). The shoulder 100 on the bar 97 (see also Fig. 4) abutting the trailing edge of the carton blank between the tabs 27, moves the carton forward between the plate 37 and the platen 38. As the bar 97 approaches the extreme forward limit of its movement the cam 185 retracts the bell crank lever 208 (Fig. 11) so as to actuate the switch mechanism in the housing 210 and cut off the current to the solenoid 47 of the carton-positioning pin 39. Thereupon the spring 49 shifts the armature 48 into the path of the approaching carton 20 and limits its forward travel.

It may be assumed that a carton blank, previously extracted from the magazine, has been moved forward into printing position and has had the adhesive applied thereto in the manner to be explained presently. Accordingly, as the shoulder 100 engages a carton delivered on the bar 97 for advancement into printing position the shoulder 101 on the spring 103 will engage a printed carton at its trailing edge between the tabs 27 and cause the printed carton to be discharged from printing position and moved into a pair of axially-aligned apertures 149 in the disks 148 of the rotating drying rack 145.

Just before the bar 97 begins its forward movement the cam 185 (see Fig. 11) will have effected a shifting of the bell crank lever 208 so as to operate the switch mechanism in the housing 210 to close the circuit to the solenoid 47. The energization of the solenoid 47 will retract the armature 48, removing the lower end thereof from the path of the carton 20, thus permitting the above-mentioned discharge of a printed carton from the space between the plate 37 and the platen 38.

As the carton blank, being advanced by the bar 97, reaches its printing position, in abutment with the armature detent 39 (see Fig. 9), the spring 104 presses the shoulder 105 down behind the trailing edge of the blank 20 at a point directly beside the contact that the carton has with the shoulder 100 on the bar 97. Thus, when the bar 97 begins its rearward or retractive movement, the last delivered blank 20 is held in place against any possibility of displacement from printing position. As the bar 97 moves rearwardly the spring 103 at the front end of the bar, engages the under surface of the blank 20, causing a depression of the shoulder 101 until such time as the bar 97 reaches its most rearward position, whereupon the spring 103 shifts the shoulder 101 upwardly into contact with the trailing edge of the blank 20 in printing position.

As the bar 97 approaches its rearmost position the cams 181 (see Figs. 5 and 10) initiate upward movement of the cross-bar 55 to thereby move the printing pads 41 up through the openings 40 in the plate 37 into contact with a carton blank 20. The stroke of the cross-bar 55, and consequently that of the printing pads 41, as effected by the cams 181 is such as to bring the printing surfaces 56 into contact with a blank 20 sufficiently to press the carton slightly against the platen 38 and thus transfer the adhesive on the printing surfaces 56 to the under surface of the carton blank 20 on the areas as indicated in Fig. 1 by the stipulated strips 129.

The open slotted form of the printing pads 41 is advantageous especially in connection with the printing of thermoplastic material, such as paraffine, because excess material may readily drain off the narrow faces of the printing fins so that the amount of adhesive material applied to the carton blank is effectively controlled. The described arrangement in which the printing pads are wholly immersed in the printing liquid is advantageous, especially in connection with the printing of thermoplastic material, because the printing pad is thereby automatically heated to the temperature of the liquid incident to the immersion of the pad in the liquid, so that there is no significant tendency for the adhesive material to set or harden on the printing pads. Instead, the heat in the printing pads serves to maintain the adhesive in proper liquid condition notwithstanding the normal tendency of the adhesive to cool and set as soon as removed from the supply contained in the tank 54.

With a carton blank 20 in position between the plate 37 and the platen 38 it is interposed between the hooked end 89 of the rod 83 and the end 87' of the rod 82 (see Fig. 5). Thus, as the cross-bar 55 approaches the crest of its stroke, the collar at the upper end of the sleeve 88 will contact the bushing 94 and press it into the sleeve 96 against the action of the spring 97. Accordingly, there will be no vertical movement of the tripper rod 83; consequently, no actuation of the disabling means D.

If, on the other hand, during the operation of the machine a carton blank should fail to be advanced to printing position the disabling means D is actuated, as the cross-bar 55 approaches the crest of its stroke, so as to cause an elevation of the platen 38 and prevent the printing surfaces 56 of the pads 41 contacting the under face of the platen.

When, in the absence of a carton blank 20 in printing position, the cross-head 55 approaches the crest of its movement, the flange on the upper end of the collar 88 contacts the bushing 94 as previously explained. However, inasmuch as there is no carton interposed between the hooked end 89 of the rod 83, such engagement of the flange on the upper end of the sleeve 88 with the bushing 94 effects an elevation of the tripper rod 83. This brings the hooked end 89 of said rod into contact with the switch rod 82 and the continued upward movement of the tripper rod 83 elevates the switch rod 82. An upward movement of the switch rod 82 rocks the arm 81, causing a depression of the button 84 so as to actuate the switch 80 and cause an energization of the magnet 76 just before the cross-bar 55 reaches the crest of its stroke.

The energization of the magnet 76 causes the armature 79 to shift the collar 71 against the action of the spring 75. The co-acting ratchet teeth on collars 70 and 71 cause the collar 71 to elevate and thus lessen the normal distance between the upper face of the collar 71 and the opposed face of the collar 74 on the post 67. As a consequence the post 67 is lifted as the bar 55 passes through the crest of its stroke. The elevation of the post 67 retracts the platen 38 moving its under surface out of reach of the printing surface 56 of the pads 41.

As soon as the cross-bar 55 recedes from the crest of its stroke the flange at the upper end of the sleeve 88 moves away from the bushing 94. The spring 97 retracts the tripper rod 83 with a consequent release of the switch rod 82 and an opening of the switch 80 so as to deenergize the solenoid 76. Thereupon the spring 75 will shift the collar 71 to restore it and the collar 70 to their relative normal positions as shown in Fig. 5.

As the cams 181 return the cross-bar 55 to its lowermost position to reimmerse printing pads 41 the cam 184 (see Fig. 15) shifts the connecting bar 203 and arm 169 against the action of the spring 173. This causes the pawl 170' to shift the ratchet 170 and rotate the revolving rack 145 to bring a pair of alined apertures 149 into horizontal registration with the space between the plate 37 and the platen 38 preparatory to receiving a printed carton blank. Simultaneously with each such movement of the rack 145 the operating mechanism 147 (see Fig. 3) causes a movement of the belt conveyor 146 to move shelves 157 on each side of the belt into registration respectively with the transfer chute 155 and the discharge chute 164. This permits a discharge of a printed carton blank to the chute 155 and into a registering shelf 157 and a discharge of a carton blank from one of the downwardly-inclined shelves 57 onto the chute 164.

As each printed carton blank moves into a pair of axially-alined slots 149 in the disks 148 the freshly applied adhesive is subject to a draft of air from the blower 174 which tends to initiate the drying of the adhesive.

Variations and modifications in the details of structure and arrangement of the parts may be resorted to within the spirit and coverage of the appended claims.

I claim:

1. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, means for delivering carton blanks into and discharging them from said printing position, a feeler connected to said reciprocable member for movement in unison therewith and positioned so as to be movable through space normally occupied by a carton blank in printing position, a member engageable and movable by said feeler in the absence of a carton blank from said printing position, and means controlled by said member for effecting elevation of said platen in the absence of a carton blank from said printing position.

2. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a cross-bar reciprocatingly mounted on said frame above said platen, a member located in said container and suspended from said cross-bar, a pad on said member disposed in registration with said plate opening, mechanism for reciprocating said cross-bar to alternately immerse said pad in the adhesive in said container and pass said pad through said plate opening into printing contact with a carton blank in said printing position, means for delivering carton blanks into and discharging them from said printing position, a post supported on said platen and extending above said cross-bar, relatively adjustable abutments carried respectively by said cross-bar and post, said abutments being so spaced from each other as to be inactive during normal printing reciprocation of said cross-bar and pad-carrying member, and means operative in the absence of a carton blank from said printing position for effecting adjustment of one of said abutments into cooperative relationship to the other abutment so as to cause elevation of said platen as an incident to the upward movement of said cross-bar during the terminal portion of its upward movement, thereby to prevent the application of adhesive to said platen in the absence of a carton blank from said printing position.

3. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a cross-bar reciprocatingly mounted on said frame above said platen, a member located in said container and suspended from said cross-bar, a pad on said member disposed in registration with said plate opening, mechanism for reciprocating said cross-bar, a post supported on said platen and extending through and above said cross-bar and slidable relative thereto, a collar rotatably mounted on said cross-bar concentrically of said post, a stop on said post above said rotatable collar a distance greater than the stroke of said cross-bar, coacting cam surfaces on said collar and said cross-bar adapted, when said collar is rotated, to effect an elevation thereof on said post from a normal, inactive position to an active position wherein the distance between said collar and stop is less than the stroke of said cross-bar and said collar and stop will be caused to contact before said cross-bar reaches the crest of its stroke, a spring normally holding said collar in said inactive position, a solenoid having its armature connected to said collar for effecting rotation of said collar upon energization of said solenoid, a normally-open switch for controlling said solenoid, a feeler movable with said cross-bar and normally engageable with a carton blank in printing position, and a switch actuator mounted on said platen in the path of movement of said feeler, said actuator being engageable and movable by said feeler in the absence of a carton blank from said printing position, thereby to effect energization of said solenoid.

4. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, a carton blank feed bar reciprocatingly mounted relative to said plate, a pair of shoulders on said bar spaced apart in the direction of the travel of said bar a distance substantially equal to the stroke thereof, said shoulders being adapted to engage a carton blank successively to shift it into printing position and to discharge it therefrom, the forwardmost of said shoulders being vertically yieldable so as to be depressible and movable along the underside of a carton blank in printing position when said bar is retracted, means for reciprocating said bar, means for delivering carton blanks one at a time to said bar when in its retracted position, and a spring-actuated detent for engaging the rear edge of a carton blank in printing position to prevent retraction of said blank as an incident to retraction of said bar.

5. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, means for delivering carton blanks into and discharging them from said printing position, a detent normally urged into the path of the carton blanks to arrest their movement so as to locate successive blanks in printing position, and means for retracting said detent in timed relationship to carton-blank discharging movement of said carton-blank delivering and discharging means, thereby to permit said means to discharge a blank from printing position.

6. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, means for delivering carton blanks into and discharging them from said printing position, a solenoid armature movable into and out of the path of movement of said carton blanks, means normally urging said armature into said path of the carton blanks to arrest their movement to locate the successive blanks in said printing position, and circuit-control mechanism synchronized with said carton-blank delivering- and discharging-means for retracting said armature when a carton blank is to be discharged from said printing position by said means.

7. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, a rotatably-mounted member including an axially-spaced pair of disks having a plurality of axially-alined slots extending inward from the circumferential edges of said disks and adapted to receive printed carton blanks from said printing position, means for rotating said member so as to successively bring pairs of said slots into blank-receiving position relative to said printing position, and means for successively delivering carton blanks into printing position and discharging them therefrom into said pairs of slots, said slotted pair of disks serving to hold the printed blanks in spaced relationship to each other and convey them slowly from said receiving position to a discharge position to thereby afford a time interval for the drying or setting of the adhesive on the blanks.

8. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, a rotatably-mounted member including an axially-spaced pair of disks having a plurality of axially-alined slots extending inward from the circumferential edges of said disks and adapted to receive printed carton blanks from said printing position, means for rotating said member so as to successively bring pairs of said slots into blank receiving position relative to said printing position, means for successively delivering carton blanks into printing position and discharging them therefrom into said pairs of slots, said slotted pair of disks serving to hold the printed blanks in spaced relationship to each other and convey them slowly from said receiving position to a discharge position to thereby afford a time interval for the drying or setting of the adhesive on the blanks, a vertically-moving conveyor having a plurality of uniformly-spaced inclined shelves and located adjacent said rotatable member so as to be adapted to receive said printed blanks from said rotatable member, and a chute arranged between said rotatable member and said conveyor whereby printed carton blanks are transferred by gravity from said rotatable member to said conveyor shelves.

9. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, a rotatably-mounted member including an axially-spaced pair of disks having a plurality of axially-alined slots extending inward from the circumferential edges of said disks and adapted to receive printed carton blanks from said printing position, means for rotating said members so as to successively bring pairs of said slots into blank receiving position relative to said printing position, means for successively delivering carton blanks into printing position and discharging them therefrom into said pairs of slots, said slotted pair of disks serving to hold the printed blanks in spaced relationship to each other and convey them slowly from said receiving position to a discharge position to thereby afford a time interval for the drying or setting of the adhesive on the blanks, a vertically-moving conveyor having a plurality of uniformly-spaced inclined shelves and located adjacent said rotatable member so as to be adapted to receive said printed blanks from said rotatable member, a chute arranged between said rotatable member and said conveyor whereby printed carton blanks are transferred by gravity from said rotatable member to said conveyor shelves, and means for synchronizing the intermittent movements of said rotatable member and conveyor so as to bring the slots in said member and the shelves on said conveyor successively into alinement with said chute.

10. In a machine for printing adhesive on a selected area on one side of a carton blank, the combination of a supporting frame, a carton-blank supporting-plate having an opening exposing an area of said carton blank on which adhesive is to be applied, a platen disposed above said plate to permit a carton blank to be inserted in printing position between said plate and said platen, an adhesive container located below said plate, a member vertically reciprocable within said container, a printing pad on said member disposed in registration with said plate opening, mechanism for reciprocating said member to alternately immerse said pad in the adhesive in said container and pass said pad through said plate opening into printing contact with a carton blank in said printing position, a conveyor arranged adjacent said plate and having a plurality of carton-blank supporting-shelves formed thereon, means for operating said conveyor to bring said shelves successively into alinement with said plate to receive carton blanks as they are discharged from said printing position, means for delivering carton blanks into and discharging them from printing position, a blower, an exhaust head connected to said blower and arranged to discharge an air current against the under surface of printed carton blanks delivered to said conveyor to thereby accelerate drying or setting of the imprinted adhesive, and means for actuating said blower.

11. In a machine for printing on the underside of a blank, a printing fluid container, a plate overlying and closing the top of said container, a rail mounted on said plate for supporting a carton blank in upwardly spaced relation to said plate, an impression member mounted for vertical reciprocation in said container in laterally offset relation to said rail, means for effecting reciprocation of said impression member to alternately immerse said member in printing fluid in said container, and move said member upwardly into printing engagement with a blank positioned on said rail over said plate, said plate being provided with an opening permitting said impression member to emerge from said container into said printing contact with the blank, a platen overlying said plate and rail in such spaced relation thereto as to be operative to back up said carton blank during said printing contact, and means for successively delivering blanks into and discharging them from said printing position.

CHARLES E. PALMER.

REFERENCES CITED

The following references are of record in the file of this patent:

UNITED STATES PATENTS

| Number | Name | Date |
|---|---|---|
| 1,448,065 | Harrich | Mar. 13, 1923 |
| 1,607,625 | Hodgkins | Nov. 23, 1926 |
| 1,935,031 | Joslin | Nov. 14, 1933 |
| 1,958,453 | Urie | May 15, 1934 |
| 2,133,390 | Kotcher et al. | Oct. 18, 1938 |
| 2,236,968 | Cunnington | Apr. 1, 1941 |
| 2,253,529 | Palewick et al. | Aug. 26, 1941 |